United States Patent [19]

Nakao

[11] Patent Number: 5,825,668
[45] Date of Patent: Oct. 20, 1998

[54] MONITORING METHOD AND APPARATUS OF SURFACE AREA OF SEMICONDUCTOR WAFER

[75] Inventor: Shuji Nakao, Tokyo, Japan

[73] Assignee: Mitsubishi Denki Kabushiki Kaisha, Tokyo, Japan

[21] Appl. No.: 792,818

[22] Filed: Jan. 30, 1997

[30] Foreign Application Priority Data

Aug. 27, 1996 [JP] Japan .................................. 8-225537

[51] Int. Cl.$^6$ ............................ G01B 13/22; C25D 11/32
[52] U.S. Cl. ........................ 364/564; 204/228; 204/231; 204/407; 324/444; 324/439
[58] Field of Search .................................... 364/564, 228; 204/194, 219, 400, 434, 435, 231, 407; 205/775, 790.5; 156/656.1, 657.1; 437/180, 225, 229; 324/425, 439, 444, 446

[56] References Cited

U.S. PATENT DOCUMENTS

| | | | |
|---|---|---|---|
| 3,617,101 | 11/1971 | Anderson | 204/196 |
| 4,065,374 | 12/1977 | Asami et al. | 204/228 |
| 4,120,759 | 10/1978 | Asami et al. | 204/14 R |
| 4,798,655 | 1/1989 | Diamond | 205/775 |
| 4,995,939 | 2/1991 | Ferenczi et al. | 324/444 |
| 5,139,624 | 8/1992 | Searson et al. | 204/129.3 |
| 5,175,124 | 12/1992 | Winebarger | 437/180 |
| 5,223,081 | 6/1993 | Doan | 156/656 |
| 5,289,132 | 2/1994 | Oksman et al. | 324/444 |
| 5,439,569 | 8/1995 | Carpio | 204/434 |

FOREIGN PATENT DOCUMENTS 5-63049  3/1993  Japan .

*Primary Examiner*—James P. Trammell
*Assistant Examiner*—Bryan Bui
*Attorney, Agent, or Firm*—McDermott, Will & Emery

[57] ABSTRACT

A surface-roughened polysilicon wafer is submerged in an electrolytic solution, and a voltage is applied between the measured wafer and a reference wafer submerged in the same electrolytic solution. The surface area of the surface-roughened polysilicon wafer is determined from the current with excellent accuracy.

9 Claims, 4 Drawing Sheets

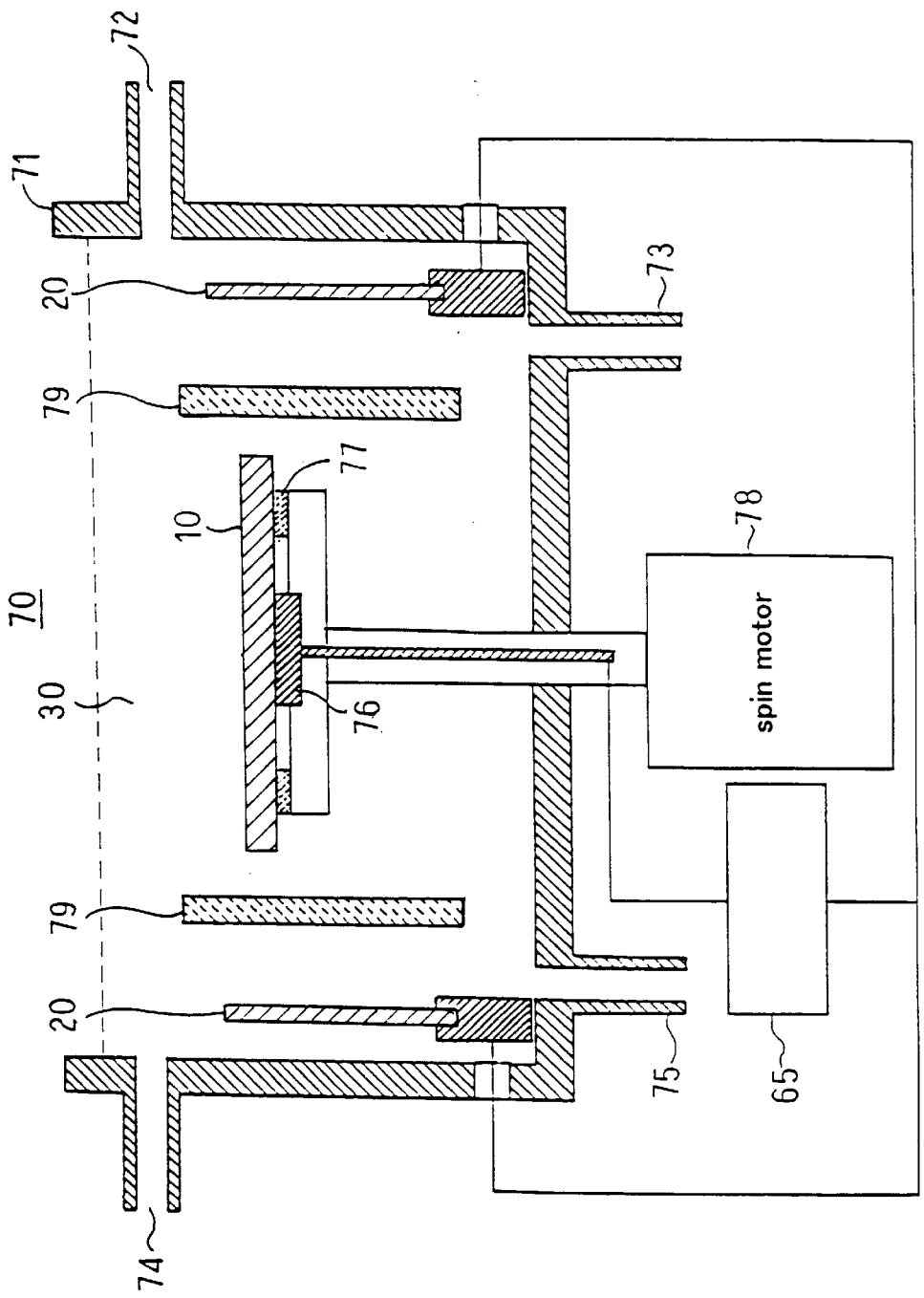

MONITORING METHOD AND APPARATUS OF SURFACE AREA OF SEMICONDUCTOR WAFER

BACKGROUND OF THE INVENTION

1. Technical Field

This invention relates to a method and device for monitoring the surface area of a semiconductor wafer, which can be effectively used for the in-process measurement of the surface area of a surface-roughened polysilicon electrode used in a DRAM capacitor.

2. Background Art

The high-level integration of DRAMs has been established by progress in geometry reduction. In short, to achieve four times the level of integration, a reduction to ½ or less is sought in the area that each individual element occupies on the surface of the semiconductor device. A capacitor, which is an indispensable element in DRAM operations, is no exception to this, and has also become increasingly reduced in size. However, its capacitance must be fixed at a around 20–30 fF/cell despite the reduction in its planar surface occupying area. So far, the required capacitance has been obtained by expanding the capacitor electrode in height, making the dielectric film thinner, increasing the dielectric constant, or the like.

A recent development in accomplishing this is the surface-roughened polysilicon electrode, which has an increased electrode surface area by forming fine irregularities on its surface. This method is performed by growing an irregular surface through a special film formation process on top of the normal surface of a polysilicon basic form. Since the capacitance is determined by the surface area, monitoring the surface area formed in this manner in the process is indispensable in manufacturing capacitors with a constant quality, i.e., with a constant capacitance.

Conventionally, a method for monitoring this surface area has been directly observing the shape of the surface with an atomic force microscope (AFM) and estimating the surface area based on the shape of an electrode. However, this method requires much time to observe a certain area of the surface, and it is only possible to observe part of the formed electrode. For this reason, it is impossible, for example, to find the average amount of increase in the surface area of the entire wafer. Furthermore, the AFM uses a probe, but the probe has a limited lifetime and requires frequent replacement. On top of this, there are differences between individual probes, requiring recalibration of the probe's characteristics with a standard sample for each replacement. This is a drawback in terms of processing efficiency.

SUMMARY OF THE INVENTION

The purpose of the present invention is to provide a method and apparatus for simplified monitoring of the surface area of a semiconductor material such as surface-roughened polysilicon electrodes.

According to one aspect of the present invention, in a monitoring method for monitoring the surface area of a semiconductor wafer, the semiconductor wafer to be measured is submerged in an electrolytic solution in which a reference electrode is also submerged. A voltage is applied between the semiconductor wafer to be measured and the reference electrode. The current that flows at that time is measured, and the surface area of the semiconductor wafer is found.

In another aspect of the present invention, in the monitoring method for monitoring the surface area of a semiconductor wafer, a surface-roughened polysilicon electrode is used as the reference electrode.

In another aspect of the present invention, in the monitoring method for monitoring the surface area of a semiconductor wafer, the surface area of a surface-roughened polysilicon wafer is found as the measured semiconductor wafer.

In another aspect of the present invention, in the monitoring method for monitoring the surface area of a semiconductor wafer, the surface area of the capacitor electrode of an integrated circuit in a manufacturing process is found as the measured semiconductor wafer.

In another aspect of the present invention, in the monitoring method for monitoring the surface area of a semiconductor wafer, an acidic or alkaline aqueous solution that brings about electrolysis of water without dissolving the reference electrode or the measured semiconductor wafer is used as the electrolytic solution.

In another aspect of the present invention, in the monitoring method for monitoring the surface area of a semiconductor wafer, a dilute acidic or dilute alkaline aqueous solution is used as the electrolytic solution.

In another aspect of the present invention, in the monitoring method for monitoring the surface area of a semiconductor wafer, a tetra-methyl-ammonium-hydroxide aqueous solution is used as the electrolytic solution.

According to another aspect of the present invention, a monitoring apparatus for monitoring the surface area of a semiconductor wafer comprises a chemical solution bath for holding an electrolytic solution. A reference electrode is submerged in the electrolytic solution in the chemical solution bath. A support member is provided for supporting a semiconductor wafer to be measured, which is submerged in the electrolytic solution. A voltage applying means is provided for applying a voltage between the reference electrode and the measured semiconductor wafer, which are submerged in said electrolytic solution. And a control means is provided to find the surface area of the semiconductor wafer to be measured from the value of the current flowing through the measured semiconductor wafer.

Other features and advantages of the present invention will become more apparent from the following description taken together with the accompanying drawings.

BRIEF DESCRIPTION OF THE DRAWINGS

FIG. 4 is structural conceptual diagram used to explain a measuring chamber for a monitoring apparatus for a roughened electrode surface according to embodiment 2 of the present invention.

DETAILED DESCRIPTION OF THE PREFERRED EMBODIMENTS

This invention will be described in further detail by way of example with reference to the accompanying drawings.

Embodiment 1

Figure 1:
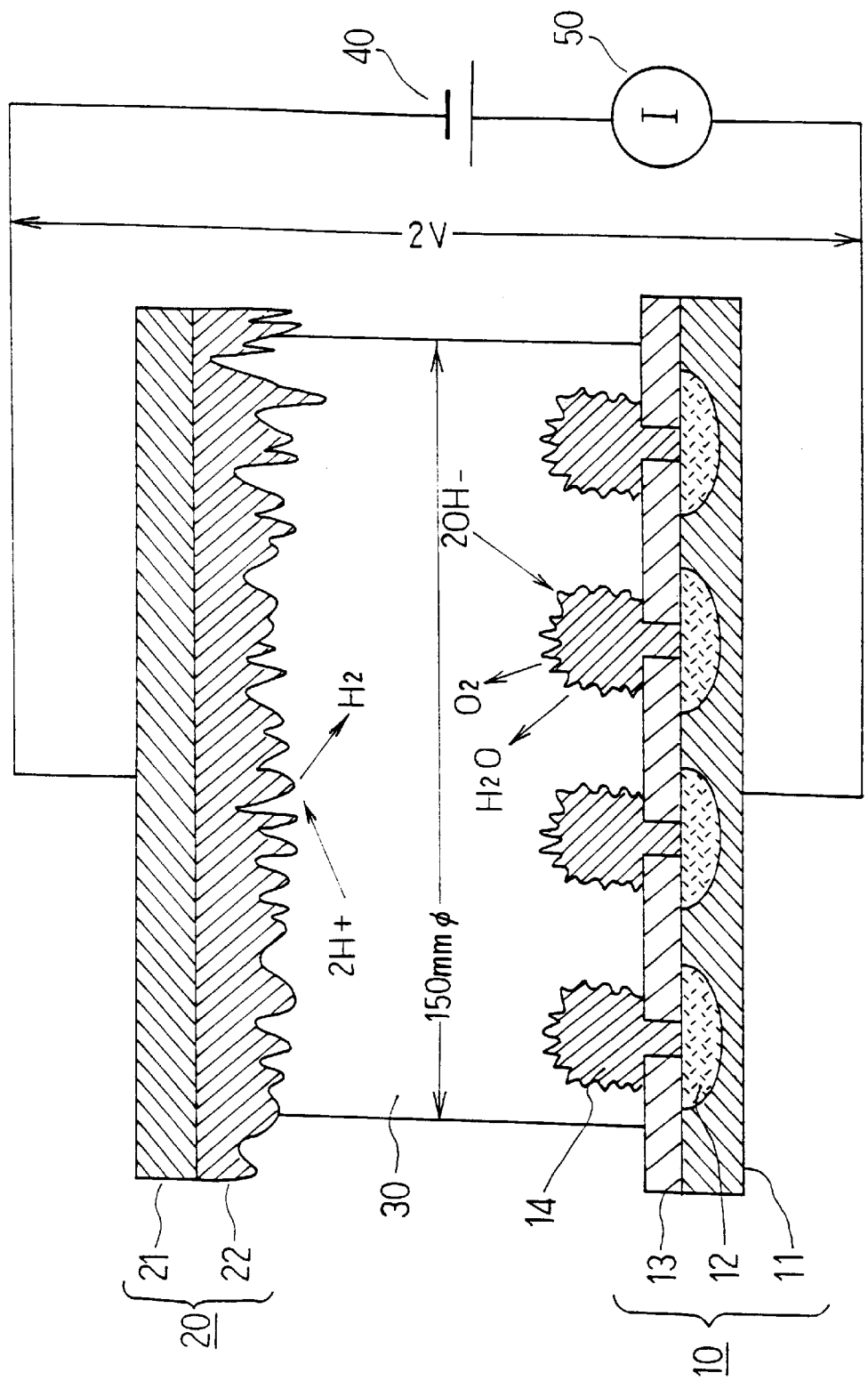
FIG. 1 is a conceptual diagram used for explaining the monitoring method of a surface-roughened electrode surface area according to embodiment 1 of the present invention.

A monitoring method for the surface area of a semiconductor wafer, and particularly for the surface area of a surface-roughened electrode, will be described in the following according to a first embodiment of the present invention. FIG. 1 is a conceptual diagram for explaining a monitoring method for surface-roughened electrode surface area according to the present embodiment. In the FIG. 10 is a wafer with a surface-roughened electrode that is the object of measurement. The wafer 10 includes a substrate portion 11, a diffused portion 12, an oxide film 13, and surface-roughened polysilicon 14. Further, 20 is a wafer serving as a reference electrode, which includes a substrate portion 21, and a polysilicon wafer surface 22 roughened over its entire surface. Further, 30 is an electrolytic solution, which is an aqueous solution of 2.38 wt % tetra-methyl-ammonium-hydroixde (TMAH) in this embodiment. Furthermore, 40 is a constant voltage source and 50 is an ammeter.

As shown in FIG. 1, the surface 14 of the wafer 10 to be measured and the reference electrode 20 are in contact with the electrolytic solution 30. Further, a voltage of 2 V, for instance, is applied between the wafer 10 to be measured and the reference electrode 20 using an external constant voltage source 40, and the current that flows through this circuit is measured by the ammeter 50. A current of 1–2 mA flows through the external circuit at that time depending on the surface area of the roughened surface 14 of the measured wafer 10. In this way, the current that flows in the circuit will indicate the surface area 14 of the surface-roughened polysilicon to be measured, and monitoring the surface can be executed easily.

At this time, it is required that the surface area of the reference electrode 20 is sufficiently large and the electrical resistance of this electrode surface is sufficiently small. It is also required to make the surface area of the reference electrode 20 as large as possible compared to the surface area of the test wafer 10. Ideally, it should be at least 10 times as large. However, measurement is possible if it is at least half of the surface area of the test wafer 10.

Moreover, the surface of the reference electrode 20 should remain unchanged. Thus the electrochemical reaction that takes place at this time should not cause any deposition onto its surface nor induce a chemical reaction with it. In other words, the electrochemical reaction only electrolytes the water without dissolving the electrode material in the acidic or alkaline aqueous solution.

Therefore, an inert material is preferably used for the reference electrode 20. For example, silicon, or a silicon wafer with surface-roughened polysilicon formed upon it, would be suitable.

As for the electrolytic solution 30, an alkaline solution or an acidic solution is used. A dilute alkali would be a suitable alkaline solution. In the category of alkaline solutions, there are both inorganic alkalis and organic alkalis, and a dilute organic alkali would be suitable. Among these, it would be preferable to use TMAH (tetra-methyl-ammonium-hydroxide), NMP (normal methyl pyrrolidine), or the like. TMAH is used as a resist developing solution and has virtually no reactivity with silicon. These are non-metallic, so there will be no contamination of the wafer due to metal ions.

Furthermore, a dilute acid would be a suitable acidic solution. In the category of acidic solutions, there are both inorganic (mineral acid) and organic solutions, and a dilute inorganic acid would be suitable. Among these, dilute hydrochloric acid, dilute acetic acid, dilute nitric acid, dilute sulfuric acid, and the like may be used.

Figure 2:
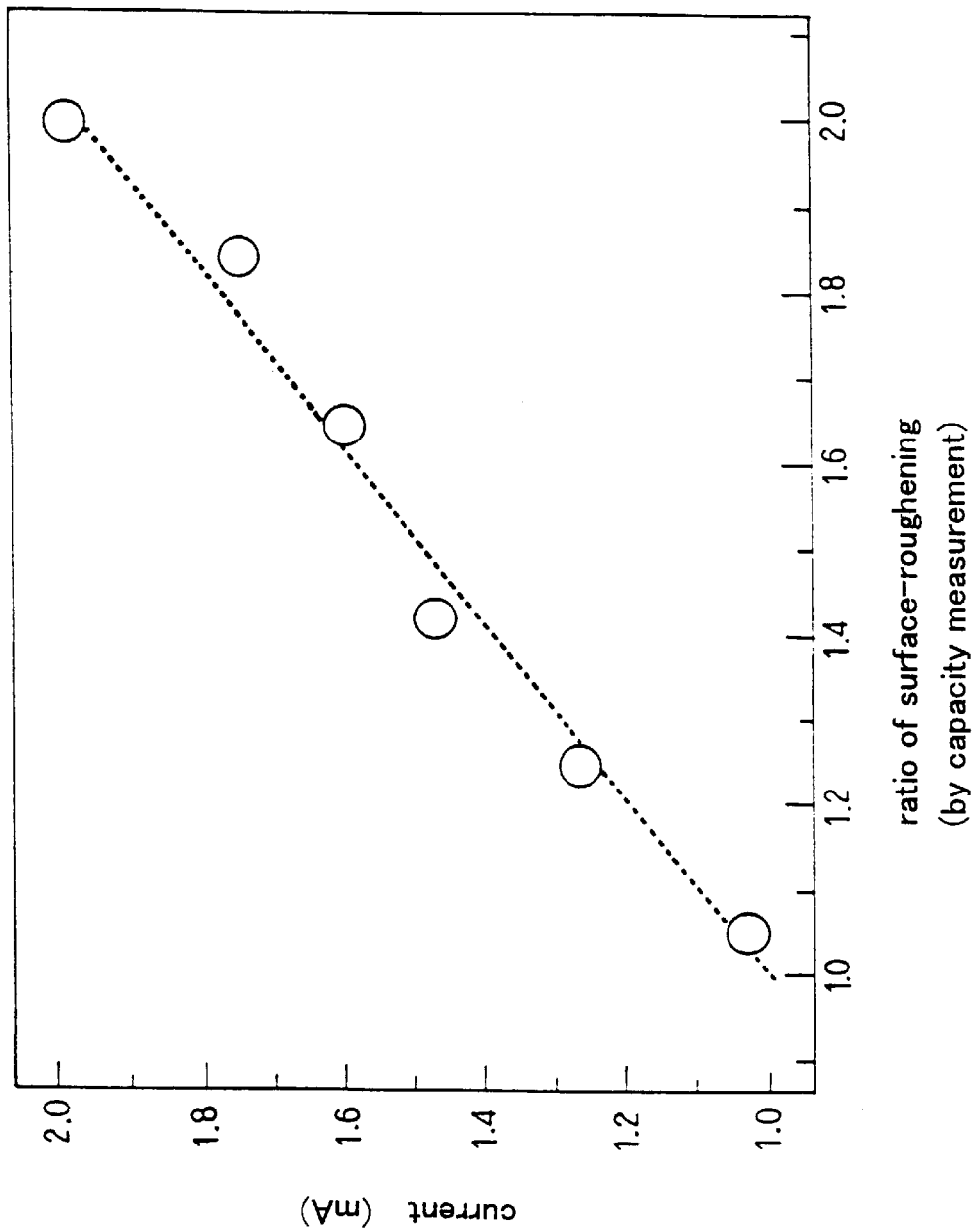
FIG. 2 is a diagram indicating the relationship between the measured current and the surface roughening rate of a roughened electrode surface.

FIG. 2 shows a plot of the relation between the ratio of surface-roughening, i.e. the ratio of increase in the surface area, of the measured electrode 10 and the current measured by the method described above. Concerning the ratio of surface-roughening of the measured electrode 10, a capacitor is formed by wafer processing and the surface area is found based on its capacitance. Thus, the value for the non-surface-roughening case is set at 1, and then the ratio of surface increase may be defined as the ratio of surface-roughening.

As is obvious from the figure, the rate of surface-roughening and the current is roughly proportional. From this, it can be seen that monitoring with good accuracy should be possible with the above-mentioned method.

Once the surface area of the measured electrode 10 is appropriately calibrated, the surface area may be determined from the absolute value of the current. However, the surface area of the measured electrode 10 may be found by comparison to a standard member for which the surface area is already known. Or, the rate of increase of the surface area of the measured member in the manufacturing process may also be measured in comparison with a standard member. In cases like this, the current may be measured by exchanging the measured member for a standard member, or the current may be measured while the measured member and the standard member are both submerged in the chemical solution.

By using such a method, it is possible to perform in-process monitoring of the surface area of a surface-roughened polysilicon electrode simply and with good accuracy as one of the steps in the manufacturing process. In comparison to the conventional method using an AFM, it is possible to obtain information about a much wider area of the electrode surface.

Furthermore, by limiting the contact portion between the wafer 10 and the electrolytic solution 30, it is possible to measure the in-wafer distribution of the rate of surface-roughening.

With this method, the inspection process within the manufacturing process is simplified, and the manufacturing period is shortened. Moreover, since its accuracy is high, and because detecting process abnormalities can be performed reliably, it brings about an improvement in yield and productivity.

Embodiment 2

Figure 3:
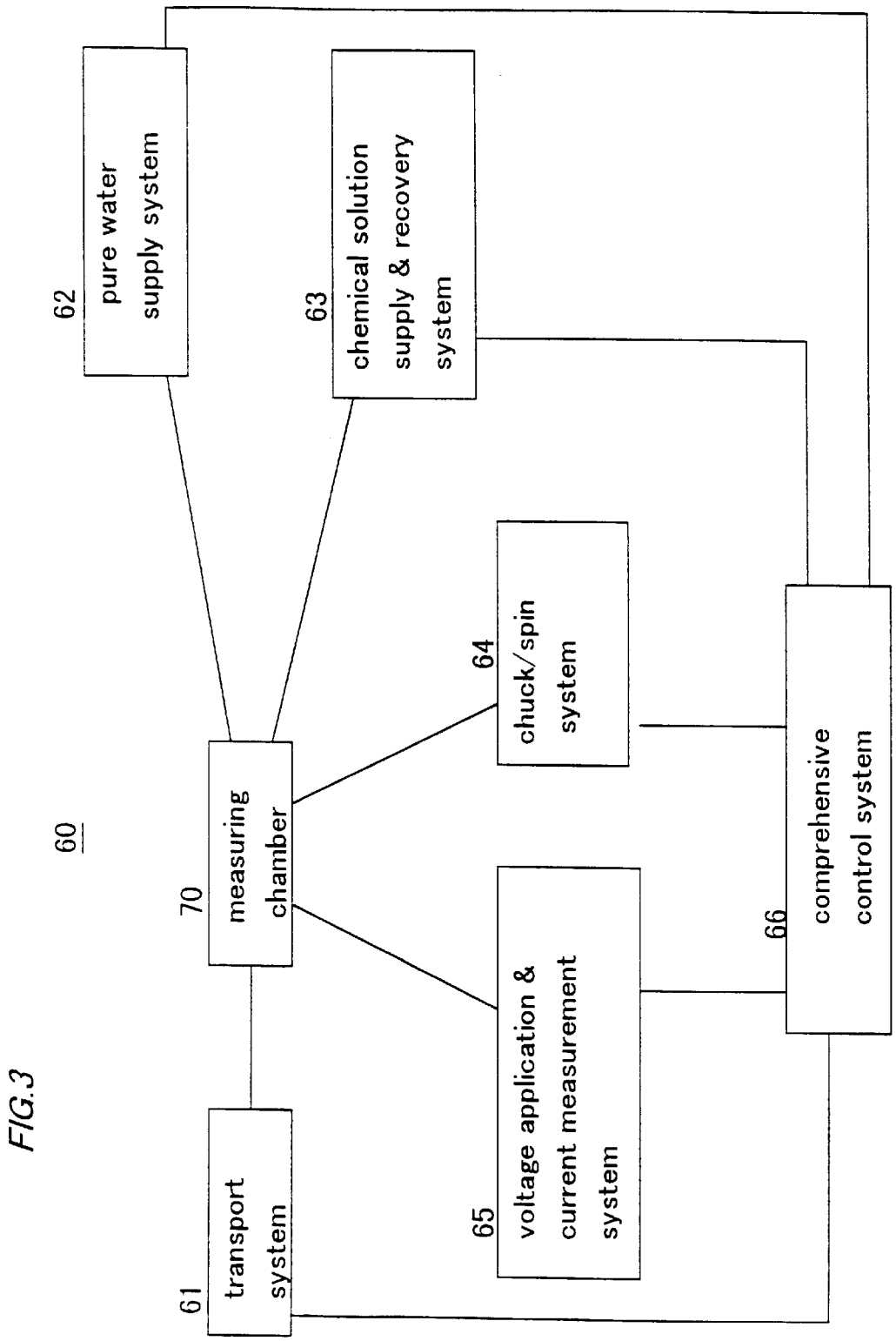
FIG. 3 is a structural conceptual diagram used to explain a monitoring apparatus of a roughened electrode surface according to embodiment 2 of the present invention.

A monitoring apparatus for monitoring the surface area of a surface-roughened electrode according to another embodiment of the present invention will be described below. FIG. 3 is a diagram showing functional blocks for the present apparatus. In the figure, the monitoring apparatus 60 includes a measuring chamber 70, in which a transported wafer to be measured comes in contact with electrolytic solution along a reference electrode. The monitoring apparatus 60 further includes a transport system 61 for transporting a wafer to be measured, a pure water supply system 62 for supplying pure water for washing the measured wafer after it is measured, and a chemical solution supply/recovery system 63 for supplying the electrolytic solution to the measuring chamber 70 and recovering it after measurement is completed. Here, the chemical solution supply/recovery system 63 has the functionality of maintaining the electrolytic solution in the measuring chamber 70 at a fixed temperature and of monitoring the conductivity of the electrolytic solution.

Next, the monitoring apparatus 60 includes a chuck/spin system 64 with a vacuum-chuck for use with the measured wafer 10 in order to hold it in the measuring chamber 70 and to spin dry the wafer after it has been washed in the pure water. A voltage application/current measurement system 65 applies a voltage between the measured wafer and the reference electrode and measures the current. Furthermore, a comprehensive control system 66 controls the operation of the monitoring apparatus 60 as a whole according to a measuring sequence, and converts the measured current into the rate of surface roughening. This monitoring apparatus 60 is operated through the comprehensive control system 66 by commands given by an operator or by an external computer.

Next, FIG. 4 shows the structural concept of the measuring chamber 70. In the FIG. 10 is a wafer to be measured, 20 is a reference electrode, which is a silicon wafer that has surface-roughened polysilicon formed over its entire surface, 30 is an electrolytic solution, and 65 is a voltage application/current measurement system. Further, the measuring chamber 70 includes a chemical solution bath 71, a supply port 72 and a recovery port. 73 for the electrolytic solution, a supply port 74 and a discharge port 75 for pure water, a voltage-application electrode 76 for applying voltage by coming in contact with the wafer to be measured, a vacuum chuck 77 for supporting the wafer to be measured, a spin motor 78 for drying the wafer 10 by spinning it, and a protective barrier 79 for protecting the silicon wafer 20, which serves as the reference electrode, when the measured wafer 10 is damaged.

Concerning the electrolytic solution 30, an alkaline solution or an acidic solution may be used as explained for the embodiment 1. For the alkaline solution, a dilute alkali, namely a dilute organic alkali and specifically TMAH or NMP (normal methyl pyrrolidine) or the like, is used. In the present embodiment., a 2.38 wt % solution of tetra-methyl-ammonium-hydroxide is used as described above. These are non-metallic alkalis, so there is no contamination of the wafer due to metal ions.

Moreover, for the acidic solution, a dilute acid, namely a dilute inorganic acid, and specifically dilute hydrochloric acid, dilute acetic acid, dilute nitric acid, dilute sulfuric acid or the like, is used.

The material of the reference electrode 20 must be inert in relation to the electrolytic solution 30. Specifically, silicon, or a silicon wafer with surface-roughened polysilicon formed upon it is suitable.

If a reference electrode 20 is a flat wafer with a diameter almost same as that of the sample, it will be preferable to employ multiple wafers in order to increase the surface area of the reference electrode. However, only a few wafers will be sufficient if the surfaces of the wafers are roughened.

For the material which constitutes the voltage-application electrode 76 contacting the measured wafer 10, stainless steel or the like would be suitable.

Furthermore, for the materials used to form the chemical solution bath 71, the vacuum chuck 77, and the protective barrier 79, stainless steel or the like would be appropriate in the case of an alkaline solution, while Teflon or the like would be suitable in the case of an acidic solution.

Next, the operations of the apparatus of the present embodiment as shown in FIGS. 3 and 4 will be explained. A wafer to be measured 10 is automatically transported into the measuring chamber 70 by the wafer transport system 61, and is held in place by the vacuum chuck 77. At this time, the chuck 77 uses a suitable elastomer for sealing to prevent the electrolytic solution from seeping into the wafer surface from the circumference of the wafer 10. The wafer rear surface is pressed up against the voltage-application electrode 76, which is set up inside the chuck 77, by the deformation of the wafer 10 due to the vacuum, so that electrical contact may be obtained.

Next, a 2.38 wt % solution of tetra-methyl-ammonium-hydroxide, controlled at a 23°±0.1° C., is introduced from the electrolytic solution supply port 72 by the chemical solution supply/recovery system 63, so that the wafer 10 and the reference electrode 20 are completely submerged.

Next, a voltage of 2.0 V is applied between the wafer 10 and the reference electrode 20 using the voltage application/current measurement system 65, and the current that flows at that time is measured. After the measurement is completed, the electrolytic solution is recovered through the electrolytic solution recovery port 73, pure water is introduced from the pure water introduction port 74, and the wafer 10 is washed. After the washing is completed, the pure water is discharged through the pure water discharge port 75, and the wafer 10 is spin dried by rotating the wafer 10 using the spin motor 78. After this, the wafer 10 is transported out of the measuring chamber 70 by the transport system 61, and measurement is completed. In this way, the rate of surface roughness of a wafer 10 can be measured automatically.

Here, with the monitoring apparatus in FIG. 4, the measured wafer 10 is held by a chuck 77. Similarly, a standard member for surface area may be held by a chuck 77, when the measurement of the current is performed. The standard member for surface area may be, in concrete terms, a standard wafer. On the other hand, a separate support member for a standard wafer may be provided, so that comparative measurement can be performed with the standard wafer and the measured wafer submerged in the electrolytic solution at the same time.

As explained above, according to the present invention, the surface roughening ratio of a roughened electrode surface of a polysilicon, for example, is measured based on the contact resistance with an electrolytic solution. Thus, a method and apparatus for easily monitoring the surface area of an electrodes over an entire electrode surface is obtained. Specifically, a method and apparatus for easily monitoring the surface area of a semiconductor wafer is obtained.

Obviously, numerous additional modifications and variations of the present invention are possible in light of the above teachings. It is therefore to be understood that within the scope of the appended claims, the present invention may be practiced otherwise than as specifically described therein.

What is claimed is:

1. A method of monitoring surface area of a semiconductor wafer, which method comprises:
   submerging a semiconductor wafer to be measured in an electrolytic solution with a reference electrode submerged therein;
   applying a voltage between said semiconductor wafer and said reference electrode to generate a current; and
   determining the surface area of said semiconductor wafer by measuring the current.

2. A monitoring method for a surface area of a semiconductor wafer as set forth in claim 1, wherein a surface-roughened polysilicon electrode is used as said reference electrode.

3. A monitoring method for a surface area of a semiconductor wafer as set forth in claim 1, wherein the surface area is found for a surface-roughened polysilicon wafer as said semiconductor wafer to be measured.

4. A monitoring method for a surface area of a semiconductor wafer as set forth in claim 1, wherein the surface area is found for the capacitor electrodes of an integrated circuit in a manufacturing process as said semiconductor wafer to be measured.

5. A monitoring method for a surface area of a semiconductor wafer as set forth in claim 1, wherein an acidic or alkaline aqueous solution to generate electrolysis of water without dissolving said reference electrode or said semiconductor wafer to be measured is used as said electrolytic solution.

6. A monitoring method for a surface area of a semiconductor wafer as set forth in claim 1, wherein a dilute acidic or dilute alkaline aqueous solution is used as said electrolytic solution.

7. A monitoring method for a surface area of a semiconductor wafer as set forth in claim 1, wherein a tetra-methyl-ammonium-hydroxide aqueous solution is used as said electrolytic solution.

8. A monitoring apparatus for a surface area of a semiconductor wafer comprising:

a chemical solution bath to hold an electrolytic solution;

a reference electrode submerged in aid electrolytic solution inside said chemical solution bath;

a support member for supporting a semiconductor wafer to be measured, which is submerged in the electrolytic solution;

a voltage applying means for applying a voltage between said reference electrode and said semiconductor wafer to be measured to generate a current, which are submerged in the electrolytic solution; and a control means for determining the surface area of said semiconductor wafer to be measured from the current between said reference electrode and said semiconductor wafer to be measured.

9. The apparatus according to claim 8, wherein the reference electrode comprise roughened polysilicon.

* * * * *